(12) United States Patent
Grandmaitre (10) Patent No.: US 7,925,787 B2
(45) Date of Patent: Apr. 12, 2011

(54) ARRANGEMENT AND METHOD FOR DELAYED RE-ALLOCATION OF ADDRESSES

(75) Inventor: Nicholas Grandmaitre, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 651 days.

(21) Appl. No.: 11/569,588

(22) PCT Filed: May 27, 2004

(86) PCT No.: PCT/EP2004/005697
§ 371 (c)(1),
(2), (4) Date: Nov. 24, 2006

(87) PCT Pub. No.: WO2005/120014
PCT Pub. Date: Dec. 15, 2005

(65) Prior Publication Data
US 2008/0019270 A1 Jan. 24, 2008

(51) Int. Cl.
*G06F 15/16* (2006.01)
(52) U.S. Cl. .................. 709/245; 709/249
(58) Field of Classification Search .......... 709/238, 709/245, 249
See application file for complete search history.

(56) References Cited

U.S. PATENT DOCUMENTS

| | | | |
|---|---|---|---|
| 6,240,464 B1 * | 5/2001 | Fijolek et al. | 709/250 |
| 6,246,670 B1 | 6/2001 | Karlsson et al. | |
| 6,618,757 B1 * | 9/2003 | Babbitt et al. | 709/226 |
| 2001/0048686 A1 * | 12/2001 | Takeda et al. | 370/401 |

FOREIGN PATENT DOCUMENTS

| | | |
|---|---|---|
| WO | 97/48246 A1 | 12/1997 |
| WO | 99/21379 A1 | 4/1999 |

OTHER PUBLICATIONS

RFC 2131—Dynamic Host Configuration Protocol (DHCP), Mar. 1997.*
R. Droms, Dynamic Host Configuration Protocol, Network Working Group, RFC 2131, Mar. 1997.
Interntional Search Report from corresponding PCT application PCT/EP04/05697.

* cited by examiner

*Primary Examiner* — Joseph E Avellino
*Assistant Examiner* — Marshall McLeod
(74) *Attorney, Agent, or Firm* — Alex Nicolaescu; Ericsson Canada Inc (57) ABSTRACT

The present invention relates to an arrangement, in a communications network, for allocating addresses to users or clients connecting to the network. It comprises at least one address holding means holding a plurality of addresses and allocating control means for, from said address holding means, allocating addresses to the users or clients, and for detecting when an address is released or when a user or a client allocated an address disconnects. It further comprises, for each pool of addresses, delay means for allowing control of the minimum time period to lapse before an address having been allocated to a user is reused, i.e. again allocated to a user, such that a minimum time period before reuse of each address can be guaranteed.

19 Claims, 7 Drawing Sheets

Fig. 6

ARRANGEMENT AND METHOD FOR DELAYED RE-ALLOCATION OF ADDRESSES

FIELD OF THE INVENTION

The present invention relates to, in a communications network, allocating addresses to clients or users connecting to the network.

STATE OF THE ART

In networks implementing dynamic addressing, allocation of addresses has to be used to provide users or clients connecting to the network with temporary addresses. Such addresses are allocated from a server in the network or from a peer. Several protocols have been standardized for handling such address allocation. One standardized protocol is the Dynamic Host Configuration Protocol (DHCP), cf. RFC (Request For Comments) 2131 3315. Another such protocol is Remote Authentication Dial in User Service (RADIUS), standardized in RFC 2865.

However, in mobile communications system such as GPRS (GSM Packet Radio Service), CDMA 2000 (Code Division Multiple Access) etc. connections to the network occur frequently and the connections are typically only maintained for short periods. IPv4 or IPv6 (Internet Protocol version 4 and 6 respectively) addresses are used which uniquely identify the user and the addresses may be kept in multiple nodes, such as nodes in authentication systems, in billing systems, and application gateways and application servers, throughout the network. Among others due to the fact that the addresses are kept at a plurality of locations a quick assignment and release of addresses get problematic when the same addresses are reused.

Currently addresses are mostly assigned in a circular fashion and a released address will only be reused when all other addresses have been assigned to users. However, with such a solution it can not be guaranteed that an address will not be reused immediately following upon release thereof. The number of addresses that are required is high, and to prevent addresses from being reused too quickly, still larger pools of addresses are required. It is also a problem that the allocation systems used today for allocation of the IPv4 or IPv6 addresses, cannot guarantee a delay before reuse of an address, which means that in fact addresses will be reused frequently or reused more or less immediately upon release, which makes it easier to predict end user IP addresses. Thus there is a problem, in such systems, that end user IP addresses e.g. addresses of mobiles, laptops etc. easily can be predicted and used for illegal purposes, which is serious.

SUMMARY OF THE INVENTION

It is therefore an object of the invention to provide an arrangement as initially referred to, through which prediction of allocated addresses is made more difficult. It is still further an object of the invention to provide an arrangement through which address allocation in dynamical addressing systems can be provided for in a safer and more trustworthy manner than hitherto. Still further it is an object to provide an arrangement through which allocation of addresses can be provided for in a simple and a flexible manner. Another object is to provide an arrangement through which address allocation can be provided for in a fast and easy manner while still guaranteeing that one and the same address is not reused immediately upon release. Furthermore it is an object to provide an arrangement through which the number addresses that need to be kept in a pool for allocation purposes can be reduced while still meeting the prevailing requirements as to security during address allocation. It is also an object to provide an arrangement through which a large number of addresses can be handled and allocated in a safe manner.

It is also an object of the invention to provide a node in a communications network through which one or more of the above mentioned objects can be fulfilled.

Further yet it is an object of the invention to suggest a method for allocating addresses in a safe and reliable manner, and at the same time in a fast manner and preferably without requiring, any increase in the number of addresses required in a pool as compared to known systems. It is also an object of the invention to suggest a method through which one or more of the above mentioned objects can be fulfilled.

Therefore an arrangement as initially referred to is provided which comprises, for each pool of addresses, or address holding means holding a pool of addresses, delay means for allowing control of the minimum time period to lapse before an address having been allocated to a user is again reused, i.e. again allocated to a user, such that a minimum time period before reuse of each address can be guaranteed. Said delay means particularly comprises a limited, given number of timers and most particularly it comprises one timer.

In a preferred implementation the address holding means holds addresses in at least three different states depending on the use status of the addresses. Most particularly the address holding means holds addresses in four different states. A first state comprises a state for holding addresses which are available for allocation to a user, a second state is a state for holding addresses occupied by users, a third state is a state for holding addresses released by a user, but not yet available for allocation, and finally a fourth state is a state for holding addresses in a waiting state. Particularly said one timer is used for activation of a transfer of all addresses of the, or a, pool, which addresses are held in said third, also denoted released, state, to said fourth, also denoted waiting, state upon expiry a first time, and for initiating transfer of all addresses held in said fourth, waiting, state to said first, available, state upon expiry of the timer the subsequent time. The allocation of addresses in said first available state to users can be done in different manners. In one implementation the lowest address held in said first state is selected or allocated to a user requesting an address. In an alternative embodiment an arbitrary address held in said first state is selected and allocated to a user requesting an address. Any appropriate algorithm or selection method can be used.

Particularly an address is kept unused during a time period which is equal to or longer than a controllably selected delay time and shorter than or equal to twice the set delay time. In one implementation the delay time is (re)configurable whereas in other embodiments it is fixed. In one particular embodiment one single delay means or timer is used for all addresses handled by the arrangement (if there is one or more pools), or one for each pool if an arrangement comprises more than one pool.

The arrangement is particularly implemented in or comprised by or associated (in communication) with a node in a mobile communication system (e.g. supporting communication of packet data). The mobile system may for example be a GPRS or a UMTS system or CDMA 2000 etc.

In one implementation the node in or in association/communication with which the arrangement is implemented comprises a GGSN (Gateway GPRS Support Node) or a CGSN (Combined GPRS Support Node).

In another implementation the arrangement is comprised by or associated or in communication with a server, e.g. a Radius-AAA server or a DHCP server. Particularly the addresses in the pool are IPv4 or IPv6 addresses. The concept can, however, of course also be implemented to other addresses as well as the arrangement can be implemented in or in communication with other nodes or servers or peers in general.

Therefore also a node in a mobile communications system is suggested, the node being of a kind as initially referred to, comprising or communicating with an arrangement which comprises delay means for allowing control of the minimum time period to lapse before an address having been allocated to a user is reused, i.e. again allocated to a user, such that lapse of a minimum time period before reuse of each address can be guaranteed. Particularly said delay means comprises one single timer. The holding means preferably holds addresses in four different states, which particularly comprises a first state for holding addresses available for allocation to a user, a second state for holding addresses occupied by users, a third state for holding addresses released by users but not yet available for allocation, and a fourth state for holding addresses in a waiting state. Particularly said one (single) timer is used for activation of transfer of all addresses of the/a pool in which addresses are held in said third, released, state to said fourth waiting state upon a first expiry, and for activation of a transfer of all addresses from said fourth, waiting, state to said first available, state upon the subsequent expiry. The delay time may particularly be configurable. Alternatively it is fixed.

In one embodiment the node comprises a packet data support node in a communications system supporting communication of packet data. Particularly it comprises a UMTS/GPRS GGSN or a CGSN or a node with a similar functionality. More generally it may comprise any peer node in a network with a functionality of allocating addresses to users. In one particular implementation it comprises a node with a server, or a server, such as for example a DHCP or a Radius AAA-server, allocating addresses in real time.

The invention, in order to solve one or more of the objects referred to above, also provides a method, for, in a communications network, providing for allocation of addresses to users or clients. The method comprises the steps of; providing addresses in address holding means comprising a pool in or associated with a node or a server in the network; keeping the addresses in four different states depending on use status of the respective addresses; transferring all addresses kept in a third state in which the addresses are released from being allocated to a user, upon expiry of a timer, to a fourth, waiting, state; transferring all the addresses in the fourth, waiting, state upon expiry of said timer the subsequent time to a first, available, state, in which said addresses are available for allocation to users, such that, for each respective address, a minimum delay time before reuse of said address, can be guaranteed.

The method particularly comprises the steps of, when a user or a client requests an address, allocating the lowest address in the first, available, state, in which addresses are held and for which at least the guaranteed minimum delay time has lapsed. Particularly the method comprises allocation of addresses substantially in real time. The addresses are particularly IPv4 or IPv6 addresses. The network particularly comprises a mobile communications network. The method may be implemented in nodes in a communication system supporting communication of packet data, such as network nodes, for example GGSNs or CGSNs or in servers, such as Radius servers or DHCP servers.

Particularly the method comprises the step of; configuring the delay time, i.e. the timer expiration time.

BRIEF DESCRIPTION OF THE DRAWINGS

The invention will in the following be further described, in a non-limiting manner, and with reference to the accompanying drawings, in which.

DETAILED DESCRIPTION OF THE INVENTION

Figure 1:
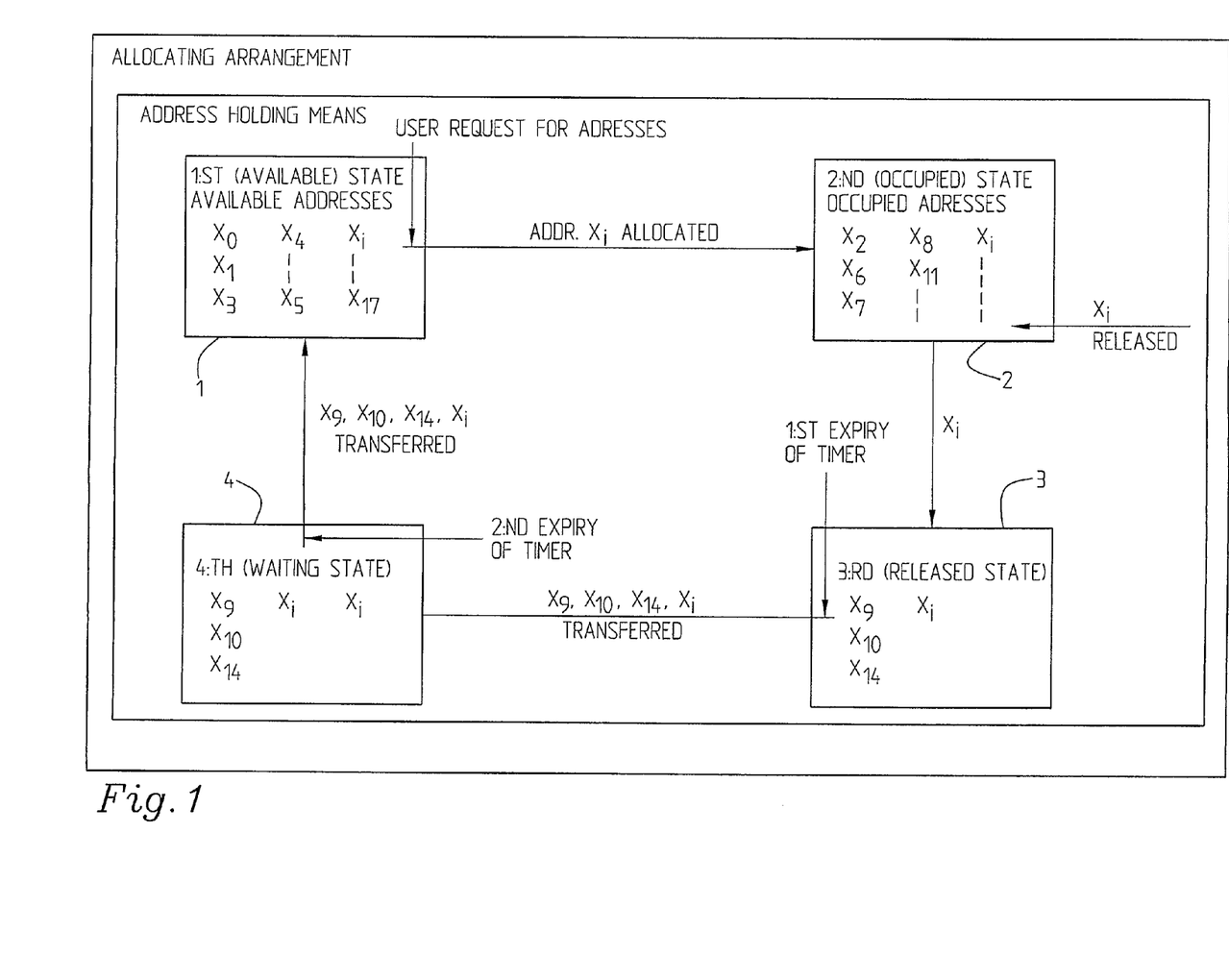
FIG. 1 conceptually illustrates an arrangement according to the inventive concept, FIG. 2 schematically illustrates a block diagram wherein the arrangement according to the invention is implemented in an office environment, e.g. implemented in (for) a DHCP server.

FIG. 1 schematically illustrates an allocating arrangement 100 according to the inventive concept with address holding means 10 comprising an address pool in which addresses are kept in four different states.

The allocating arrangement 100 may, as referred to earlier in the application, be provided in a network node, such as for example in a GGSN or a CGSN, it may be associated with or in communication with such node or any other node handling address allocation, or it may be provided in server means handling or allocating addresses, or it may be in communication with server means allocating or handling addresses. In FIG. 1 the four different states are illustrated, namely a first or available state, 1, a second or occupied state, 2, a third or released state, 3, and a fourth or waiting state, 4. Software is provided for keeping, at least, information about the different addresses in the different states, and as compared to a known systems, an additional parameter has to be configured, namely a minimum time period before individual addresses should be allowed to be reused. According to the invention the released state and the waiting state are separated in order to be able to avoid the use a timer, or starting a timer, for every separate address being handled. Generally, for example in GGSNs or other nodes performing the same functionality as far as addressing handling is confirmed, even hundreds of thousands of addresses may be used. Starting and handling one timer per address would therefore not be feasable, both due to limitations as far as storing capacity is concerned as well as processor utilization is concerned. If, thus, a combined released and waiting state were to be used, this would mean that several times more storing capacity would be required per address. Thus, according to the inventive concept there is one single timer for each allocating arrangement or one timer per address holding means.

It is in FIG. 1 supposed that addresses $x_0$, $x_1$, $x_3$, $x_4$, $x_5$, $x_i$, $X_{17}$ are in the first, available state meaning that they are all available for allocation to a network user. In order to explain the inventive concept, it is here supposed that a user requests an address and that, in any appropriate manner, an addresses is selected by the allocating arrangement, i.e. according to any criteria, arbitrarily or according to some algorithm. The inventive concept is not limited to any specific way of a selecting addresses for allocation from the available state 1. Thus, in this case it is supposed that address $x_i$ is allocated. This handling is not illustrated in any figure, but merely the handling in the allocating arrangement since the address allocation itself is known and what is important for the inventive concept is how the addresses are handled in the allocating arrangement. Thus, since an address $x_i$ is selected and allocated, it is put in the second, occupied state 2, the addresses in which state are considered to be utilized in for example the GPRS network, in the GGSN and all connected, external networks. An address enters the second, occupied, state 2 at any time when it is allocated to a user. In this case it is supposed that addresses $x_2, x_6, x_7, x_8, x_{11}, x_i$ for the moment are handled in the second, occupied state 2. It is subsequently supposed that the user to whom address $x_i$ has been allocated disconnects or is disconnected. $x_i$ is then released and transferred from the second, occupied, state 2 to the third, released state 3. The released state 3 is a state which is used to hold an address before it is transferred to the waiting state 4. Addresses are entered into the released state 2 at any time when a user disconnects or is disconnected. An address in the released state 2 is considered to be released, for example, in the GGSN, the GPRS network and all connected external networks. In the released state 2 the address will not be allocated. In this particular embodiment it is supposed that addresses $x_9, x_{10}, x_{14}, x_i$ are in the third, released state. It is then supposed that the one or single timer expires. Expiry of the timer (as far as addresses in the third state are concerned) then initiates a substantially simultaneous transfer of all addresses in the third, released state, to the fourth, waiting state, i.e. addresses $x_9, x_{10}, x_{11}, x_i$ are all transferred at one and the same time. An address kept in the waiting state is considered to be released in the GGSN, the GPRS network and all connected external networks. Thus, when the timer expires once more, addresses $x_9, x_{10}, x_{14}, x_i$ are all substantially simultaneously transferred to the first, available, state 1. It should be clear that this figure is shown as referring to different moments of time for the respective states and it is intended to illustrate the procedure when an address $(x_i)$ is transferred from one state to another.

If for example two addresses are considered, address a1 used by mobile user A and address b1 used by a mobile user B, the procedure might e.g. be as follows: The user A with address a1 disconnects. The address a1 is then substantially immediately transferred to the released state. It is subsequently supposed that the single timer expires and address a1 is then transferred to the waiting state. Then user B with address b1 disconnects and address b1 enters the released state. Then the single timer expires again. Address b1 then enters the waiting state whereas when the timer expires a1 enters the available state, i.e. it is the second time that the timer expires as far as address a1 is concerned, whereas it is the first time that it expires as far as address b1 is concerned. In both cases, of course, also all other addresses in the released state, enter the available state at the same time, whereas all the other addresses in the waiting state at the same time enter the available state upon expiry of the timer.

The delay is the minimum time period that should lapse before an address is reused. The length of the delay could be configurable or fixed. Generally a long delay has the impact that addresses will be held longer and more addresses will be needed. If for example 100 mobile stations are connecting and requesting an address every second and 100 mobile stations are disconnecting and releasing an address every second and with, for example, a delay of 60 seconds before reuse, $60 \times 100 = 6000$ addresses will be requested before the timer expires and released state addresses are put in waiting state. That is however the best case, the actual moment in time at which an address is released has to be considered. If the single timer expires at 00:00, then an address released at 00:01 will actually be held for 59 seconds and then put into the waiting state for 60 seconds. To calculate the worst case, the delay will be doubled; then $60 \times 2 \times 100 = 12.000$ addresses will be required.

Figure 2:
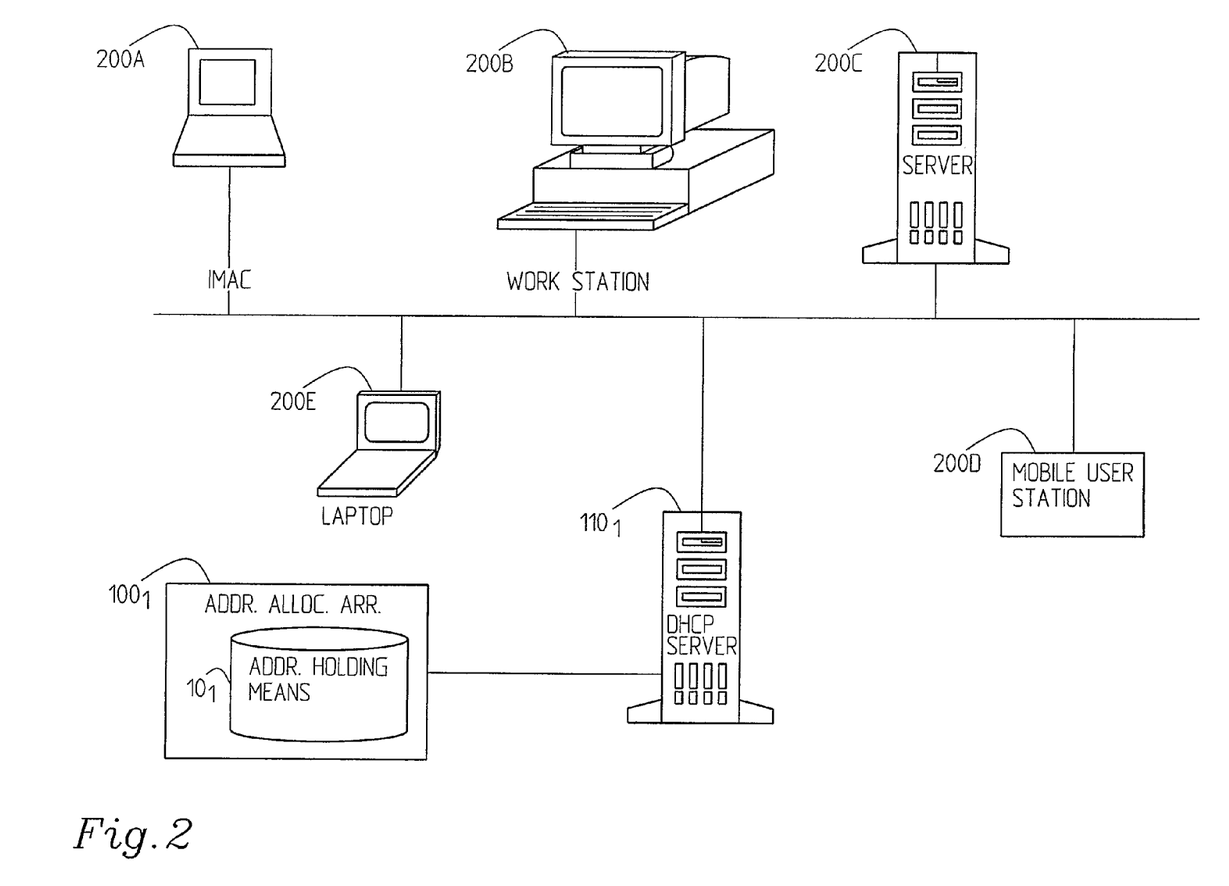

As referred to above, an arrangement according to the present invention can be implemented in a number of different ways. FIG. 2 illustrates an address allocating arrangement 100$_1$ as implemented in an office network environment. Any computer, e.g. iMAC 200A, workstation 200B, server 200C, mobile user station 200D, and Laptop 200E are supposed to send a DHCP protocol defined request for an address. The request will arrive at the DHCP server which here uses the address allocation procedure as described above, the request will be answered and then the IP address is provided in the response to the request. It should be clear that the implementation of the inventive concept is not as advantageous in such an environment as it would be in an environment where there are many short connections, for example in wireless networks. However, for example for tracking purposes, addresses may be required to be held for a particular amount of time and therefore the inventive concept may also with advantage be implemented in such systems.

Figure 3:
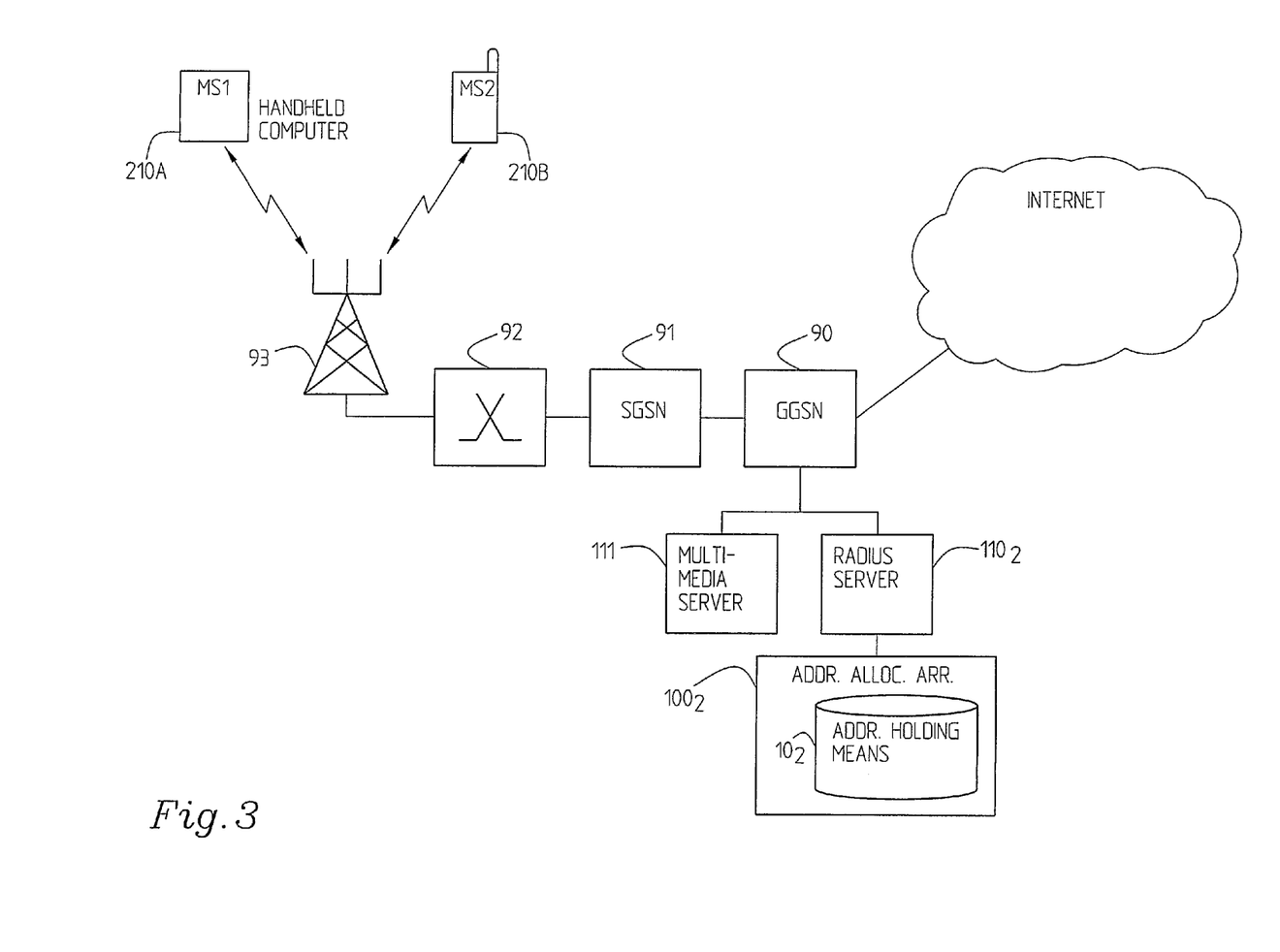
FIG. 3 is a schematical block diagram illustrating an implementation of the inventive concept wherein the arrangement is provided or associated with a Radius server connected to a GGSN.

FIG. 3 schematically illustrates the implementation of the inventive concept in a mobile communications system. A mobile station, MS1 210A, which here comprises a handheld computer or MS2 210B, which here comprises a mobile telephone, may connect to the radio base station 93, which communicates with a switching arrangement 92 which in turn sets up a connection between the mobile station MS1 or MS2 and, here, SGSN 91. When this has been done, in any conventional manner, it is supposed that the mobile station is attached but still not connected.

It is supposed that a mobile station MS1 or MS2 initiates a connection for being connected to the network for data transfer, e.g. Internet browsing, sending of e-mail etc. The GGSN 90 (Gateway GPRS Support Node) will then be contacted by SGSN 91 to request access for example to Internet and optionally an IP address (IPv4 or IPv6) from the Radius server 110$_2$. GGSN 90 then sends a request to the Radius server to get an IP address and the Radius server 110$_2$ launches the process of allocating an IP address using allocating arrangement 100$_2$ according to the inventive concept including the guaranteed delay functionality. The Radius server 110$_2$ thus, in this implementation, uses the inventive address allocation procedure to provide an address to the mobile station. The Radius server 110$_2$ will then fetch an address in the time delay address allocating arrangement 100$_2$ comprising an address pool 10$_2$ (address holding means). The fetched address is forwarded via GGSN 90, SGSN 91, switch 92 and base station 93 to the mobile station, MS1 or MS2. The allocated address may advantageously be shared/used in multimedia and charging nodes, (e.g. a multimedia server 111) in an optional, advantageous embodiment. In such embodiments, the multimedia and/or charging systems may be informed of the allocated IP address. Since such systems may hold on to the address after an address is released, the time delay guaranteed allocation procedure according to the inventive concept can with advantage be implemented.

At a subsequent stage it is supposed that the mobile station disconnects from Internet or stops data transfer. Thus, the MS, having finished using data e.g. Internet or e-mail, forwards a request to disconnect, which will reach SGSN 91. SGSN 91 then requests GGSN 90 to release the IP address it previously had allocated. GGSN 90 then forwards a request to the Radius server $110_2$ to release the IP address. The Radius server informs the address allocating arrangement $100_2$ and then the procedure will be as described with the reference to FIG. 1 above. In the particularly illustrated embodiment it is supposed that the address allocating arrangement $100_2$ is associated with and in communication with the Radius server $110_2$. In an alternative implementation the address allocating arrangement could have been arranged in a node comprising the Radius server and the address allocation arrangement (and possibly other elements).

Figure 4A:
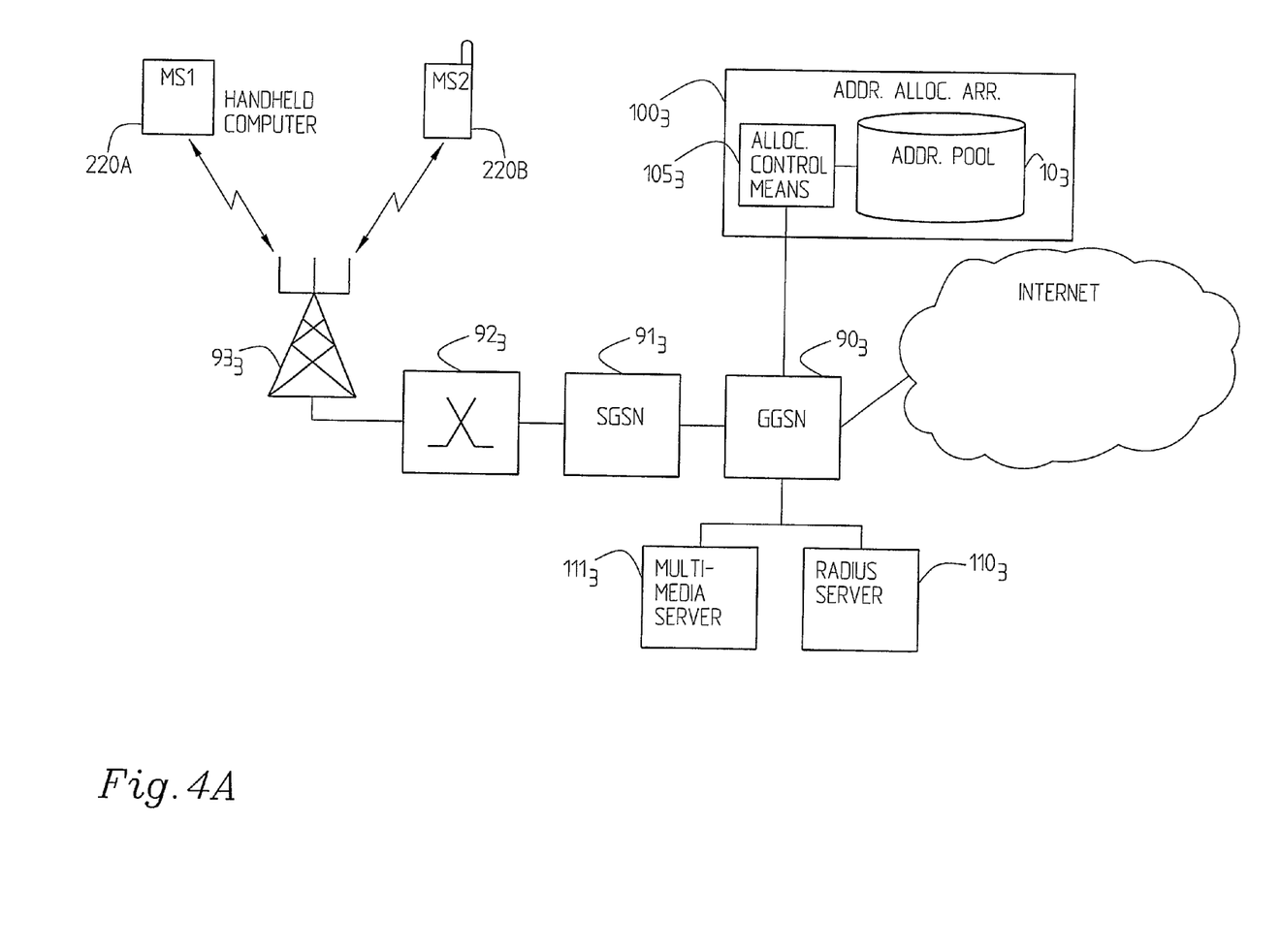
FIG. 4A is a schematical block diagram illustrating an arrangement according to the inventive concept associated with a GGSN.

FIG. 4A shows an alternative implementation of the inventive concept in which the address allocating arrangement $100_3$ is associated with or communicates with GGSN $90_3$ instead of with radio server $110_3$. Also in this embodiment it should be clear that the address allocating arrangement $100_3$ alternatively could have been provided in the GGSN node 93. In this embodiment also the allocation control means $105_3$ are illustrated; they could of course also be included in the other embodiments, but they can function in any known or appropriate manner, performing the actual allocation once an address has been provided according to the inventive concept and establishing when a user disconnects etc.

The embodiment of FIG. 4A will in the following be explained. It is supposed that a mobile station MS1 220A or MS2 220B attaches to the network by first connecting to the base station $93_3$. The base station $93_3$ communicates with the switching arrangement $92_3$, which in turns sets up a connection from the mobile station (MS1 or MS2) with the SGSN $91_3$. As in the preceding embodiment, the mobile station at this stage is considered to be attached but not connected.

In a subsequent step it is supposed that the mobile station MS1/MS2 initiates a connection for data, i.e. browsing the Internet, sending of e-mail etc. GGSN $90_3$ will then be contacted by SGSN $91_3$ to request for Internet access and optionally an IP address (IPv4 or IPv6). GGSN $90_3$ will then be requested to provide an IP address and initiates the process of allocating an IP address according to the inventive concept by GGSN $90_3$ requesting allocation of an address form the address allocating arrangement $100_3$, as described with reference to for example FIG. 1. The address will be forwarded via SGSN $91_3$, switching arrangement $92_3$, base station $93_3$ to mobile station MS1 or MS2.

As in the preceding embodiment the address allocated may be shared or used in multimedia and/or charging nodes. Subsequently, when the mobile station disconnects e.g. from Internet or stops data transfer, it will forward a request to disconnect, which reaches the SGSN $91_3$ (it should be clear that the MS may also be disconnected by the network etc. It does of course not matter whether the disconnection is initiated from the MS side or from the network side, the important thing being that it is disconnected). However, it is supposed that SGSN $91_3$ requests that GGSN releases the previously allocated IP address and GGSN then sends a release request to the address allocating arrangement $100_3$ as discussed above, and the procedure will continue as discussed for example with reference to FIG. 1.

Figure 4B:
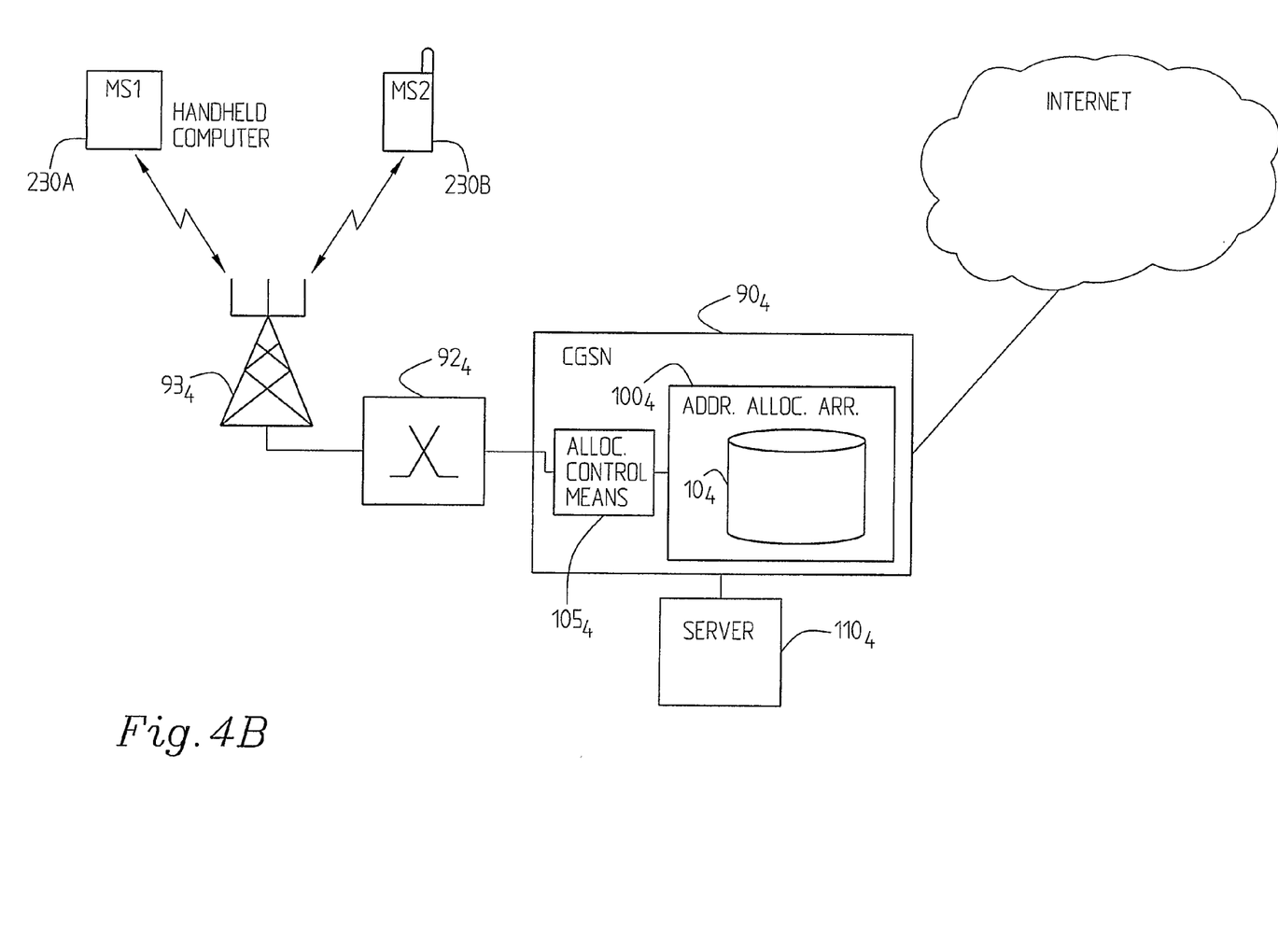
FIG. 4B is a schematical block diagram of an implementation in which the arrangement is provided in a CGSN, FIG. 5 schematically illustrates, with reference to a time axis, the variation in actual delay time.

FIG. 4B shows an implementation similar to that of FIG. 4A, but with the difference that the SGSN and the GGSN are combined in a GGSN (combined GPRS support node) including both the functionality of an SGSN and a GGSN. In this case it is also illustrated that the address allocating arrangement $100_4$ with address pool $10_4$ and the allocation control means $105_4$ is provided in the CGSN $90_4$. Of course, the address allocating arrangement $100_4$ might alternatively be provided externally of the SGSN, cf. FIG. 4A, and it is here supposed that the GGSN $90_4$ communicates with one or more servers, here merely schematically illustrated a server $110_4$, it being of no importance of the functioning of the inventive concept. In other respects the functioning is similar to that described above with reference to FIGS. 1-4A. (In FIGS. 2, 3, 4A the allocating arrangement might of course also be provided in the node itself.)

Figure 5:
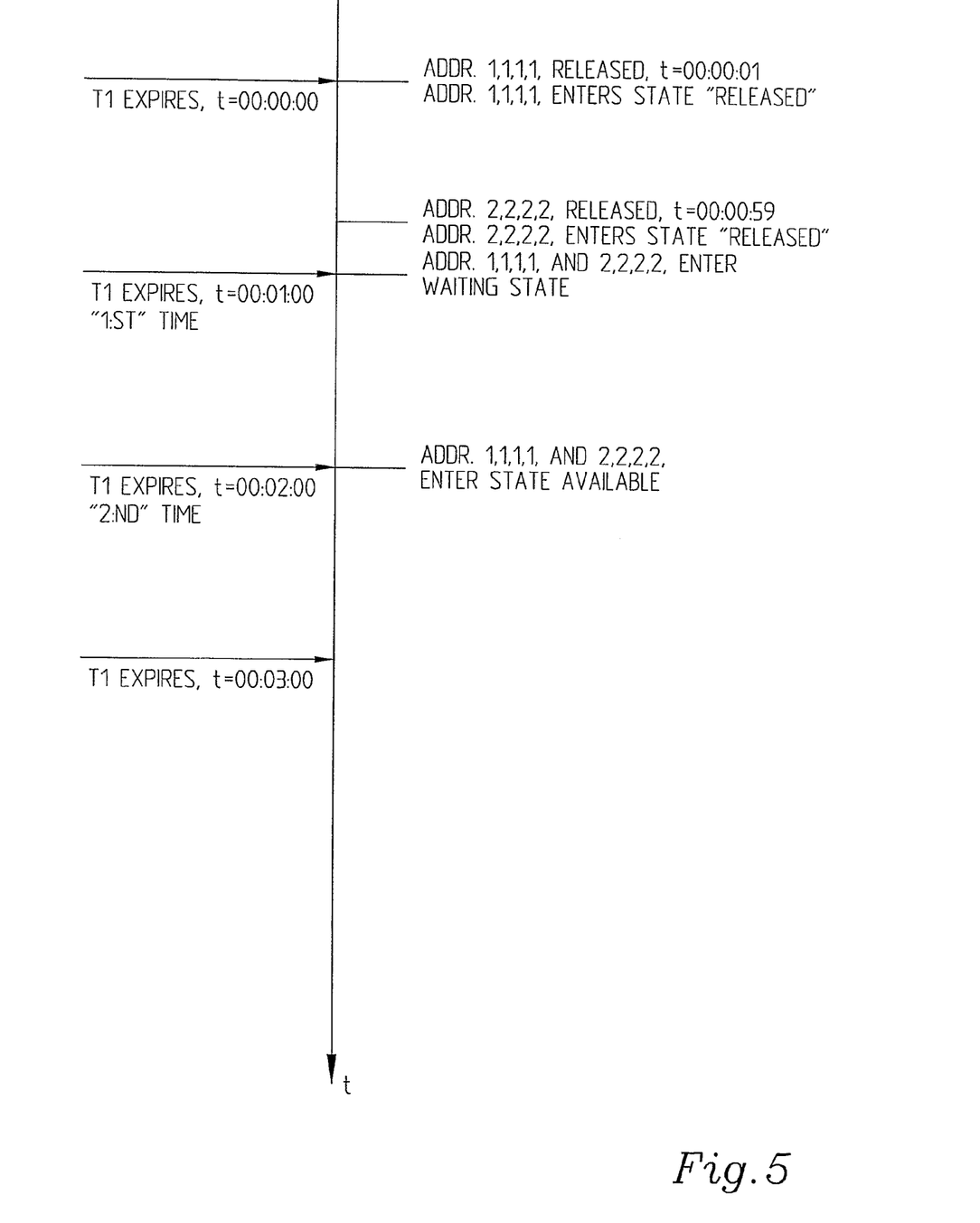

FIG. 5 shows a relation between delay and number of addresses required or used. It is illustrated with reference to a time scale and it is supposed that there is one single timer T1. Thus, it is supposed that at 00:00:00 T1 expires. At t=00:00:00 it is supposed that address 1.1.1.1. is released. It then more or less instantaneously enters the state released. Somewhat later, t=00:00:59 it is supposed that address 2.2.2.2. is released and more or less instantaneously enters the state released. Then, when t=00:01:00, it is supposed that T1 expires (with respect to these addresses, the first time). Addresses 1.1.1.1. and 2.2.2.2. which both are in state released, then simultaneously are transferred to the waiting state. After lapse of a further expiration period for T1, when t=00:02:00, T1 expires for the second time for the respective addresses. This initiates transfer of addresses 1.1.1.1. and 2.2.2.2. in the waiting state to the available state. Subsequently T1 expires at t=00:03:00, which however does not affect the addresses in question.

This shows the relation between delay and the number of addresses used. In the "worst" case, when an address is released at the relative start of a cycle, the actual time before the address enters the available state is almost twice the delay time. Address 1.1.1.1. here illustrates the "worst" case when an address is released substantially at that the beginning of a cycle of the timer, whereas address 2.2.2.2. shows the "best" case where an address is released substantially at the end of the cycle of the timer. It should be clear that this figure is extremely simplified and it is merely included to illustrate the relationships and "worst" and "best" case respectively.

Figure 6:
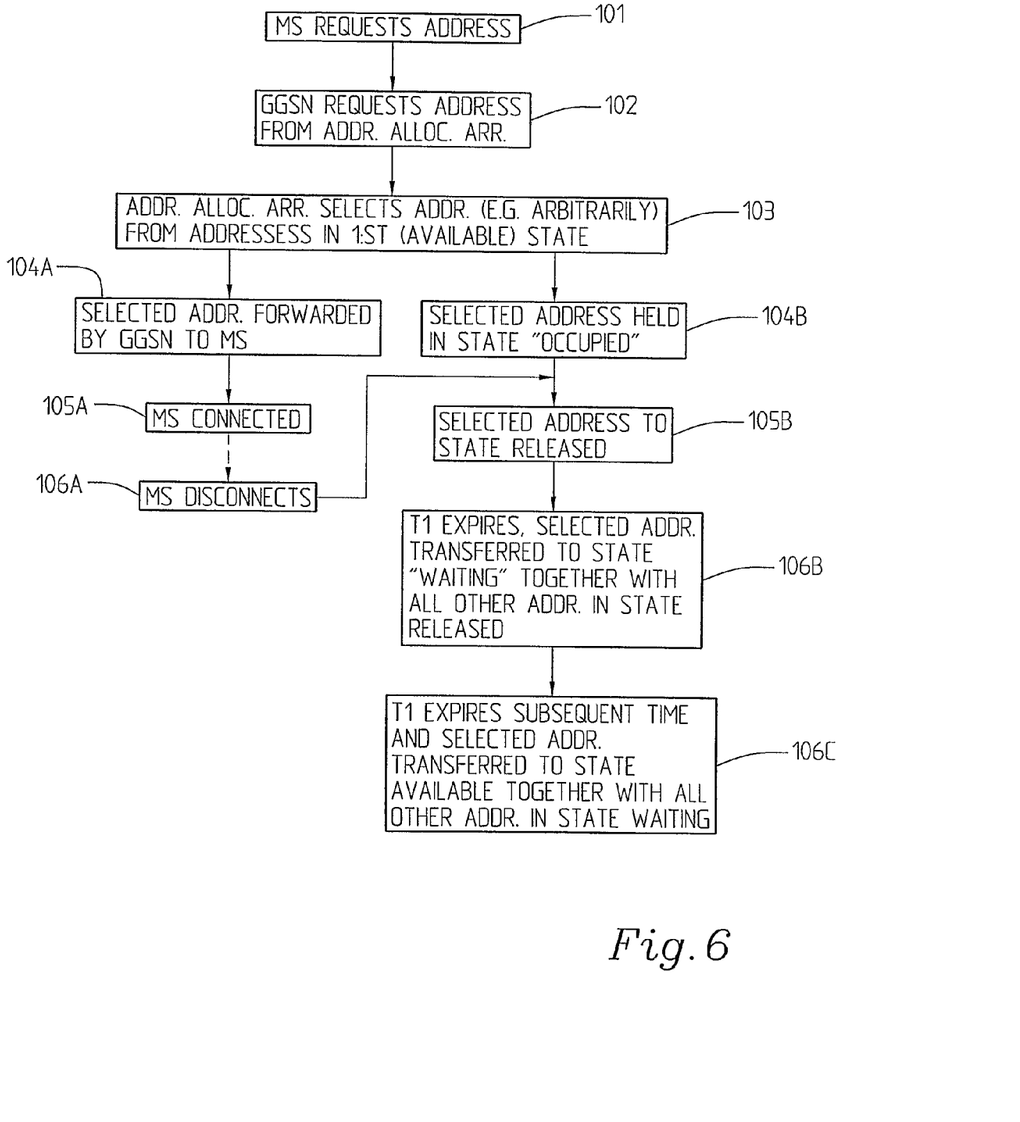
FIG. 6 is a flow diagram illustrating one embodiment of the inventive concept.

FIG. 6 is a flow diagram schematically illustrating the procedure when a mobile station requests allocation of an address, and how said address is handled in the address allocating arrangement. Thus, it is supposed that MS request an address, 101. In this embodiment, it is supposed that e.g. a GGSN requests the address from the address allocating arrangement, 102. It should be clear that it does not have to be a GGSN, it might just as well be a CGSN or a server such as a Radius server or a DHCP etc, or more generally any peer/node handling allocation of addresses. The address allocating arrangement then selects an address, for example arbitrarily, among the addresses held in the first, available state, 103. Once selected, the address is forwarded, in this case, via GGSN to MS, 104A (via SGSN etc.). In the address allocating arrangement the selected address is transferred to state occupied, i.e. the second state, 104B. This is supposed to take place substantially simultaneously. It is also supposed that MS remains connected for some time, 105A. In the meanwhile, the selected address is kept in state occupied, 104. However, after some time it is supposed that MS disconnects, 106A. The selected, previously allocated address, is then released and transferred to state released. Subsequently, when the single timer of the address allocating arrangement expires, the selected address is, together with all other addresses in state released, transferred to state waiting, 106B. Subsequently, when timer T1 expires the next time, the selected address is transferred to state available together with all other addresses in the waiting state, 106C.

It should be clear that the invention of course not is limited to the specific, illustrated embodiments but that it can be varied in a number of ways within the scope of the appended claims. It is an advantage of the invention that addresses can be allocated substantially in real time at a high rate, and that for each address a delay time can be guaranteed during which the address is not reallocated. This may be particularly advantageous for IPv6 address allocation, since there will be even more addresses allocations when there is an almost unlimited amount of IPv6 addresses and therefore address allocation rates will presumably increase. It should also be clear that the inventive concept can be implemented in or by every node handling address allocation. It should also be clear that address allocation (selection) itself can be performed using any algorithm among the addresses in state available. Also in other aspects numerous variations are possible.

It is an advantage of the invention that a delay time can be guaranteed for every address in any traffic scenario. It is also an advantage that fewer addresses will be required if circular address allocation schemes are implemented.

The invention claimed is:

1. An arrangement, in a communications network, for allocating addresses to users or clients connecting to the network, comprising:
    an address holding means for holding a plurality of addresses in a plurality of different states, wherein the plurality of different states comprises a first state that holds addresses available for allocation, a second state that holds addresses currently allocated, a third state that holds addresses released but not yet available for allocation, and a fourth state holds addresses in a waiting state; and
    delay means for transferring, at a first expiry of a timer, addresses held in the third state to the fourth state and, at a second expiry of the timer, addresses held in the fourth state to the first state, whereby addresses are held in the fourth state for at least the duration of the timer.

2. An arrangement according to claim 1, wherein the timer has a fixed delay time.

3. An arrangement according to claim 1, wherein the timer has a configurable delay time.

4. An arrangement according to claim 1, wherein the arrangement is associated with a node in a mobile communication system supporting communication of packet data.

5. An arrangement according to claim 4, wherein the mobile system is a GPRS or a UMTS system and the node comprises a GGSN or a CGSN.

6. An arrangement according to claim 4, wherein the arrangement is associated with a server selected from a group consisting of a Radius-AAA server and a DHCP server.

7. An arrangement according to claim 1, wherein the addresses are IPv4 or IPv6 addresses.

8. A node in a mobile communications system associated with an arrangement for allocating addresses to users/subscribers connecting to the network, comprising:
    an address holding means for holding a plurality of addresses in a plurality of different states, wherein the plurality of different states comprises a first state that holds addresses available for allocation, a second state that holds addresses currently allocated, a third state that holds addresses released but not yet available for allocation, and a fourth state holds addresses in a waiting state;
    delay means for transferring, at a first expiry of a timer, addresses held in the third state to the fourth state and, at a second expiry of the timer, addresses held in the fourth state to the first state, whereby addresses are held in the fourth state for at least the duration of the timer.

9. A node according to claim 8, wherein the timer has a configurable delay time.

10. A node according to claim 8, wherein the timer has a fixed delay time.

11. A node according to claim 8, further comprising a packet data support node in a communications system supporting communication of packet data.

12. A node according to claim 11, wherein the packet data support node is selected from a group consisting of a UMTS/GPRS GGSN, a CGSN and a node with a similar functionality.

13. A node according to claims 8, being further associated with a server allocating addresses in real time.

14. A method for, in a communications network, providing allocation of addresses to users/clients comprising the steps of:
    providing a plurality of addresses in address holding means associated with a node or a server in the network;
    keeping the addresses in four different states depending on use status of the respective addresses;
    transferring all addresses kept in a third state in which the addresses are released upon first expiry of a timer to a fourth, waiting, state, and
    transferring all the addresses in the fourth waiting state upon second expiry of the timer to a first, available, state in which the addresses are available for allocation to users, whereby addresses are held in the fourth state for at least the duration of the timer.

15. A method according to claim 14, further comprising the steps of, when a user or client requests an address:
    allocating the lowest address in the first available state, in which addresses are held.

16. A method according to claim 14, wherein addresses are allocated substantially in real time.

17. A method according to claim 14, wherein the addresses are IPv4 or IPv6 addresses and the network is a mobile communications network.

18. A method according to claim 14, wherein the steps are performed in a node in a communication system supporting communication of packet data or in a server.

19. A method according to claim 14, further comprising the step of configuring the delay timer.

* * * * *